United States Patent [19]

Matsui

[11] Patent Number: 5,447,316
[45] Date of Patent: Sep. 5, 1995

[54] GAS SEAL

[75] Inventor: Shingo Matsui, Sakado, Japan

[73] Assignee: Eagle Industry Co., Ltd., Tokyo, Japan

[21] Appl. No.: 13,503

[22] Filed: Feb. 4, 1993

[30] Foreign Application Priority Data

Feb. 6, 1992 [JP] Japan .............................. 4-012424 U
Feb. 6, 1992 [JP] Japan .............................. 4-012425 U

[51] Int. Cl.6 ............................................. F16J 15/34
[52] U.S. Cl. .................................. 277/96.1; 277/81 R
[58] Field of Search ....................... 277/96, 96.1, 81 R, 277/94

[56] References Cited

U.S. PATENT DOCUMENTS

| | | | |
|---|---|---|---|
| 3,751,045 | 8/1973 | Lindeboom | 277/96.1 |
| 3,767,212 | 10/1973 | Ludwig | 277/96 |
| 3,804,424 | 4/1974 | Gardner | 277/96.1 |
| 4,290,613 | 9/1981 | Scott | 277/96.1 |
| 4,406,466 | 9/1983 | Geary, Jr. | 277/96.1 |
| 4,972,986 | 11/1990 | Lipschitz | 277/3 |
| 5,066,026 | 11/1991 | Heck et al. | 277/96.1 |
| 5,174,584 | 12/1992 | Lahrman | 277/96.1 |

FOREIGN PATENT DOCUMENTS

| | | |
|---|---|---|
| 4000073 | 1/1992 | Japan .............................. 277/96.1 |
| 1176695 | 1/1970 | United Kingdom . |
| 1378259 | 12/1974 | United Kingdom . |
| 2197396 | 5/1988 | United Kingdom . |
| 2242944 | 10/1991 | United Kingdom . |

Primary Examiner—Daniel G. DePumpo
Attorney, Agent, or Firm—Kenyon & Kenyon

[57] ABSTRACT

A gas seal includes a pair of relatively rotatable slide members and a plurality of grooves for generating a hydrodynamic floating force between sliding surfaces of the slide members during rotation are circumferentially formed to one of the slide members so as to extend in a radial direction. A first dam portion for partitioning an inside space in the grooves from an external portion on an outer diameter side of the grooves is formed along an entire peripheral portion of the one of the slide members. Each of the grooves has a V-shaped cross section having a central bottom portion and tapered portions extending from the central bottom portion with inclinations reverse to each other in the circumferential direction thereof and a second dam portion is formed to the bottom portion so as to extend upward. In another aspect of the present invention, a a second dam portion for bilaterally partitioning each of the grooves is formed to a central bottom portion of the groove so as to extend in a radial direction. Each groove has a cross section along the circumferential direction having tapered portions extending from the second dam portion with inclinations reverse to each other and gas flow passages are formed on both sides of the first and second dam portions.

15 Claims, 6 Drawing Sheets

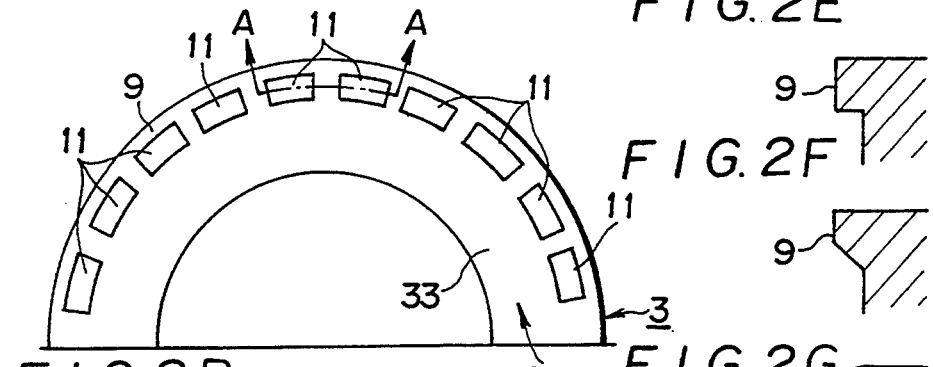
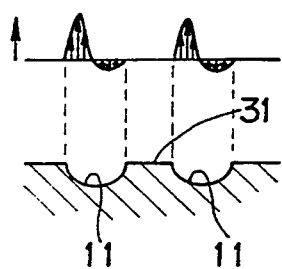
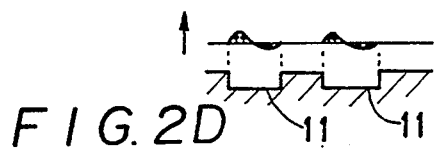
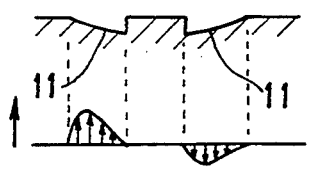
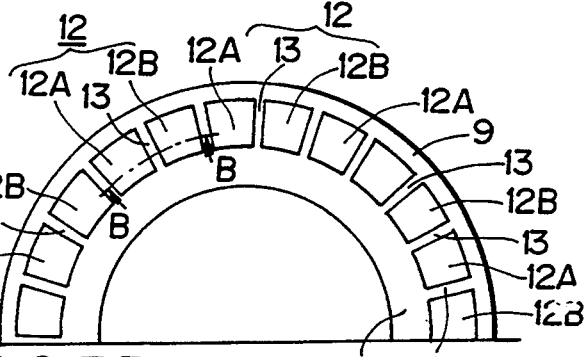
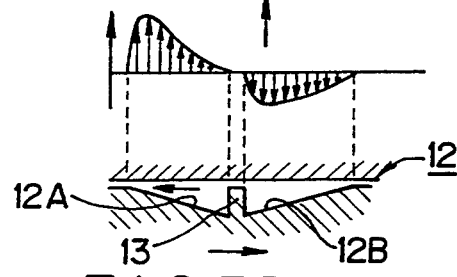
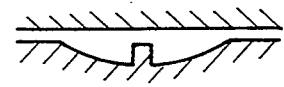
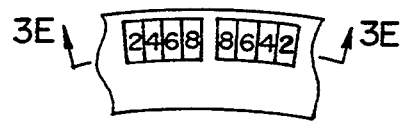
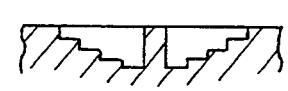

GAS SEAL

BACKGROUND OF THE INVENTION

The present invention relates to a gas seal and more particularly is concerned with a bilaterally rotatable gas seal utilized for a shaft sealing device for a rotation shaft.

One example of a gas seal of this type is Shown in FIG. 7A, in which slide members 100 and 101 on the fixed side and the rotating side, respectively, are disposed and the slide member 101 on the rotating side has a sliding surface 101A on which grooves 102 are formed for generating hydrodynamic floating force between the sliding surfaces of both slide members 100 and 101.

The slide member 100 on the fixed side 100 is supported by a spring 103, and in usual, the slide member 100 is raised by involving gas G between the sliding surfaces 100A and 101A of both the sliding members 100 and 101, and a gas space having a width h of 1 to 10 micron is caused between the slide members 100 and 101, which are sealed with an allowable slight leakage.

As shown in FIGS. 7B to 7E, a spiral groove 102A and radial grooves 102B are shown as examples of the floating force generation grooves 102. In the example of the spiral groove 102A, the gas G flows inside along the inner periphery by the rotation of the slide member to thereby cause a floating force, and on the other hand, in the example of the radial groove 102B, the gas G is discharged together with the generation of the floating force by centrifugal force caused by the wide groove width because the grooves are opened on an outer diameter side, and particularly, under high speed and low pressure condition, the centrifugal force is large and the gas pushing force is weak, so that the floating force is weak, thus stable sealing performance is not expected.

Furthermore, FIGS. 7F and 7G show another example in which a T-shaped groove 102C is formed as the floating force generation groove, and in such example of the T-shaped groove 102C, more increased floating force can be obtained in comparison with the example of the raidal groove, but the floating force is less than that of the example of the spiral groove. However, the gas seal device having a slide member provided with the spiral groove is of a uni-directionally, not bilaterally, rotatable gas seal device.

SUMMARY OF THE INVENTION

An object of the present invention is to substantially eliminate defects or drawbacks encountered in the prior art and to provide a gas seal provided with a dam portion to an outer periphery of hydrodynamic floating force generation grooves formed on a sliding surface of a slide member and extending radially for the purpose of achieving a stable sliding performance and causing a sufficient floating force to the slide member.

These and other objects can be achieved according to the present invention by providing a gas seal in which a pair of relatively rotatable slide members are disposed and a plurality of grooves for generating a hydrodynamic floating force between sliding surfaces of the slide members during rotation are circumferentially formed to one of the slide members so as to extend in a radial direction, the improvement in which a first dam portion for partitioning an inside space in the grooves from an external portion on an outer diameter side of the grooves is formed along an entire peripheral portion of the one of the slide members.

In preferred embodiments, the grooves are formed so as to have various cross sectional shapes such as rectangular, oval, wedged or other shape along an entire circumferential direction of the groove.

Each of the grooves may have a V-shaped cross section having a central bottom portion and tapered portions extending from the central bottom portion with inclinations reverse to each other in the circumferential direction thereof and a second dam portion is formed to the bottom portion so as to extend upward. The first dam portion may be formed so that the outer peripheral edge thereof extends beyond or substantially equal to the outer peripheral edge of the opposing slide member on which the grooves are not formed.

In another aspect of the present invention, there is provided a gas seal in which a pair of relatively rotatable slide members are disposed and a plurality of grooves for generating a hydrodynamic floating force between sliding surfaces of the slide members during rotation are circumferentially formed to one of the slide members so as to extend in a radial direction, the improvement in which a first dam portion for partitioning an inside space of the grooves from an external portion is formed on an outer diameter side of the grooves, a second dam portion for bilaterally partitioning each of the grooves is formed to a central bottom portion of the groove so as to extend in a radial direction thereof, each of the grooves has a cross section along the circumferential direction thereof having tapered portions extending from the second dam portion with inclinations reverse to each other in the circomferential direction thereof, and gas flow passages are formed on both sides of the first and second dam portions.

In this embodiment, various modifications may be made such as or similar to those described with reference to the former aspect of the present invention.

According to the embodiments of the present invention, the gas involved in a space between the opposing slide members can be prevented from leaking outward for the location of the first dam portion disposed at an outer diameter side of floating force generation grooves formed to the slide member even if an influence of the centrifugal force caused by the rotation of the rotation shaft. In the embodiment in which gas flow passages are formed, the amount of the gas to be involved is increased, thus increasing the floating force of the slide member, which function may be increased in accordance with the shapes of the grooves and the first dam portion. The formation of the second dam portion will further increase these functions and effects.

BRIEF DESCRIPTION OF THE DRAWINGS

For a better understanding of the present invention and to show how the same is carried out, reference is made to, by way of accompanying drawings, in which:

FIG. 2A is a view showing a half of a slide member of the gas seal on which the floating force generation grooves are formed;

FIGS. 2B to 2D are sectional views showing cross sections of various modification of the grooves together with dynamic pressure generated by the grooves;

FIGS. 2E to 2G are brief views showing various shapes of a first dam portion formed to the outer periphery of the slide member on which the grooves are formed;

FIG. 3A is a modification of FIG. 2A;

FIG. 3B to 3E are modifications of FIG. 2B, for example, related to the slide member of FIG. 3A;

DESCRIPTION OF THE PREFERRED EMBODIMENTS

Figure 1A:
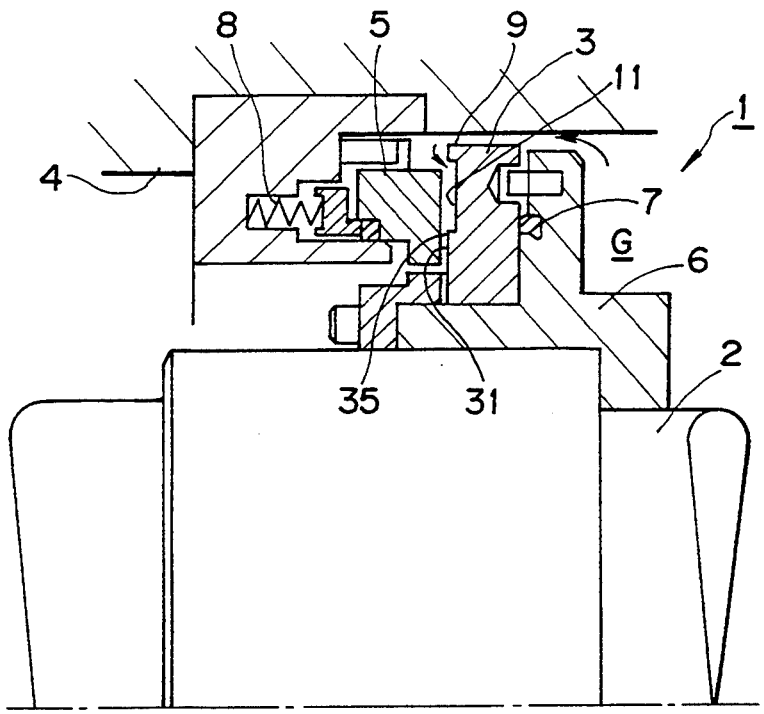
FIG. 1A is a sectional view, half eliminated, of a gas seal according to one embodiment of the present invention.

FIG. 1 shows a general structure of a gas seal according to one embodiment of the present invention, in which reference numeral 1 denotes an entire structure of a gas seal or gas sealing device, which comprises a slide member 3 on the rotating side fixed to a rotation shaft 2 and a slide member 5 on the fixed side mounted to a housing 4. The rotating side slide member 3 is arranged on the side of a gas G as an object to be sealed so that the gas G leaks from an outer peripheral side to an inner peripheral side. The rotating side slide member 3 is fixed in an axial direction and a rotating direction with respect to the rotation shaft 2 through an support member 6, and an 0-ring 7 for attaining a sealing function is mounted between the support member 6 and a back surface side of the rotating side slide member 3.

On the other hand, the fixed side slide member 5 is fixed in the rotating direction so as not to be rotated and in the axial direction to be movable and it is urged against the rotating side slide member 3 by a spring force of a spring 8. Opposing surfaces of the rotating and fixed side slide members 3 and 5 are formed to be flat and extend in normal to the axial directions thereof, the opposing surfaces being constructed as mutually slidable sliding surfaces 31 and 35, respectively, to seal the gas G between these surfaces. A groove means composed of a plurality of grooves 11 for generating hydrodynamic floating force during the rotation of the rotation shaft 2 are formed on either one of these opposing surfaces 31 or 35 of the slide member 3 or 5, the rotation side slide member 3 in the illustrated embodiment, so as to radially extend in the circumferential direction of the sliding surface 31 of the slide member 3. The grooves 11 are called floating force generation grooves hereinafter.

The floating force generation grooves 11 extend from an outer diameter side of the rotation side slide member 3 towards an inner diameter side to an intermediate position thereof. That is, the sliding surface 31 includes an area 33 formed with no groove on the inner diameter side. Accordingly, during the operation with the rotation shaft 2 being not rotated, the sliding surface 31 tightly contact the sliding surface 35 of the fixed side slide member 5 with no gap therebetween in the no groove area 33 to thereby seal the gas G as shown in FIGS. 1E to 1H, and on the contrary, during the rotating operation of the rotation shaft 2, the gas G is involved in the floating force generation grooves 11 to thereby generate the hydrodynamic floating force between the sliding surfaces 31 and 35 of the respective slide members 3 and 5.

Figure 1B:
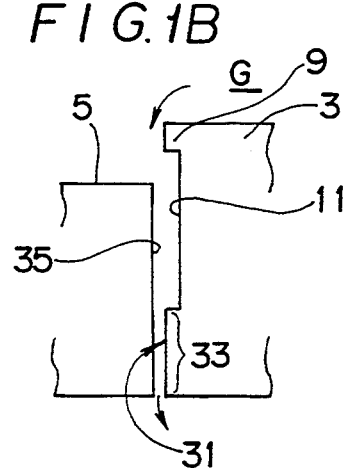
FIGS. 1B to 1H show schematic side views showing a groove formed to a slide member of the gas seal for causing a floating force in floating and not-floating conditions.
Figure 1C:
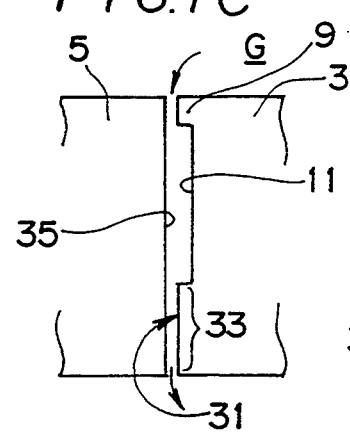

According to the present invention, a portion 9 for preventing the gas G from escaping outward by the centrifugal force caused by the rotation of the rotation shaft 2 is formed to the outer peripheral portion of the slide member 3 on the outer diameter side of the floating force generation grooves 11, as a first dam portion 9. The location of such dam portion 9 acts to prevent the involved gas G from escaping by the centrifugal force to thereby keep stable the sliding motion. As shown in FIG. 1B, the first dam portion 9 is positioned outside the outer diameter end side of the fixed side slide member 5, but as shown in FIG. 1C, the first dam portion 9 may be formed to a position opposing to the sliding surface 35 of the fixed side slide member 5 without extending beyond the outer periphery of the slide member 5.

Figure 1D:
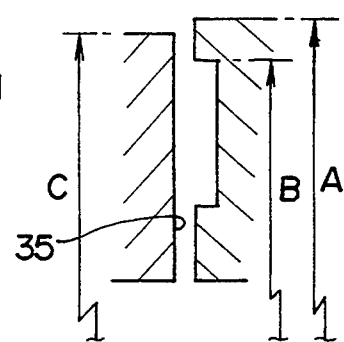
Figure 1E:
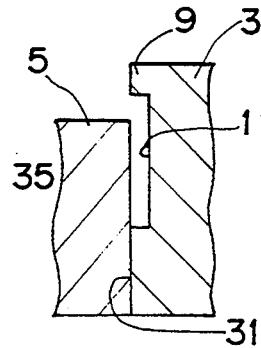
Figure 1F:
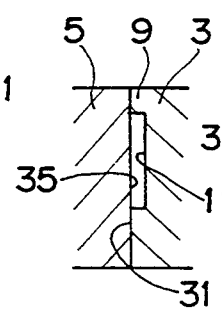
Figure 1G:
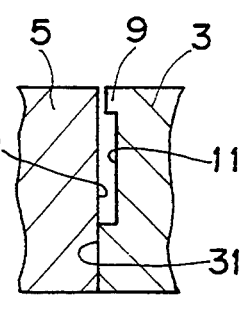
Figure 1H:
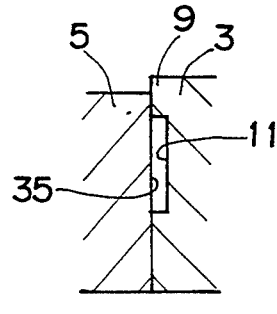

FIG. 1D shows another example in which the outer peripheral edge of the slide member 3 extend slightly beyond the outer peripheral edge of the other slide member 5, but the groove 11 is inside the edge in comparison with the example of FIG. 1B. FIGS. 1E to 1H are views showing conditions in which any floating force is not caused in the cases of FIGS. 1B to 1D, in which when the slight gap is formed between the opposing slide members such as in cases of FIGS. 1C and 1G, the gas is easily involved inside the grooves 11.

FIGS. 2 and 3 represent the embodiments of these floating force generation grooves 11.

Namely, referring to FIGS. 2A to 2C, the floating force generation grooves 11 are formed each to have a rectangular cross section or an oval cross section. In this example, the first dam portion 9 is formed at a portion along the entire widthwise direction of the outer diameter end portions of the floating force generation grooves 11 and the height of the first dam portion 9 is made substantially equal to the level of the sliding surface 31 of the rotating side slide member 3. Accordingly, the upper surface of the first dam portion 9 is formed as a flat surface portion continuous to the sliding surface 31. It may be possible to form the first dam portion 9 so as to have a height slightly lower than the sliding surface 31. Further, in the example of FIG. 1B, in which the first dam portion 9 is positioned outward from the outer end of the sliding surface 35, the first dam portion 9 will be formed so as to have the height higher than the sliding surface 31.

FIG. 2C shows an example of the groove 11 having a rectangular cross section and FIG. 2D shows an example of the groove 11 having a wedged cross section. FIGS. 2E to 2G shows examples of the first dam portion 9 having various outer shapes.

FIGS. 3A and 3B represent an example in which floating force generation grooves 12 each having a taper-stepped cross section. That is, as shown in FIG. 3B, each floating force generation groove 12 has a V-shaped section and a projection 13 projecting upward from the bottom of the V-shaped groove 12 as a second dam portion 13 in this example. According to the location of the projected second dam portion 13 in addition to the first dam portion 9, floating force generation groove 12 has tapered surfaces 12A and 12B having reverse upward inclination, as viewed in FIG. 3B, with respect to the central second dam portion 13.

According to this embodiment, the distribution of the dynamic pressure caused between the sliding surfaces of the respective slide members is shown in FIG. 3B, in which the pressure is lowered at the tapered surface 12B on the gas upstream flow side and hence a negative pressure acts thereon, and on the contrary, the pressure at the tapered surface 12A on the gas downstream flow side beyond the second dam portion 13 is increased by a wedge function, thus causing a positive floating force. According to the location of the second dam portion 13, the negative pressure at the tapered surface 12B is made small and the positive pressure is hence made large, and as a whole of the entire structure of the floating force generation groove 12, a positive pressure is caused to thereby obtain a large floating force.

FIG. 3C is another example of the groove 11 of FIG. 3A having a round cross section and FIGS. 3D and 3E show another example of the groove 11 of FIG. 3A in which the groove 11 is formed so as to have stepwise tapered portions on both sides of the second dam portion 13.

As described, the positive floating force due to the wedge function of the floating force generation groove 12 having the taper-stepped cross section can be further increased in combination of the first dam portion 9 as mentioned in the former embodiment, thus improving the stability in operation of the gas seal.

FIGS. 4 to 6 show a further embodiment of a gas seal according to the present invention, in which like reference numerals are added to members or portions corresponding to those of the former embodiments of FIGS. 1 to 3.

Figure 4A:
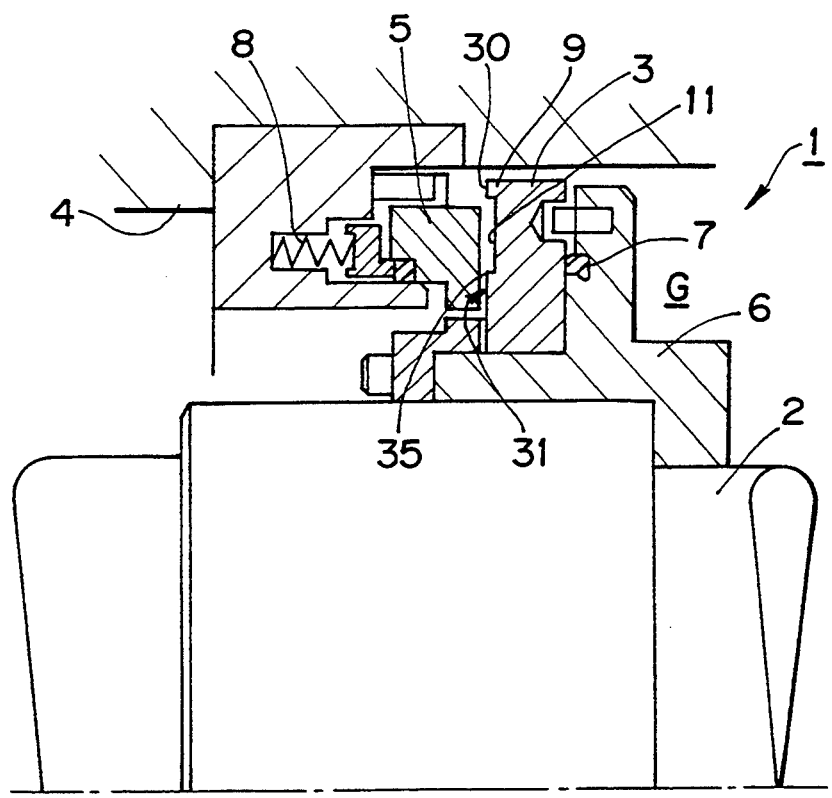
FIG. 4A and 4B–4C are views similar to those of FIGS. 1A to 1B–1D, but related to another embodiment of the gas seal according to the present invention.
Figure 4B:
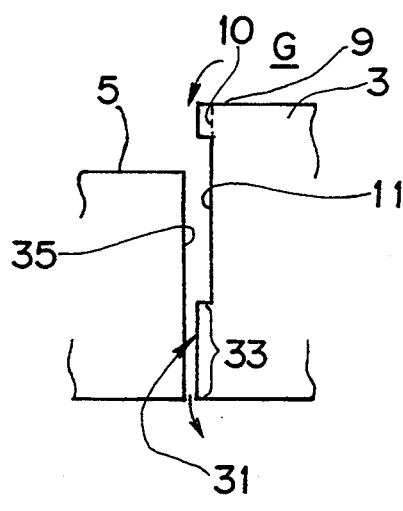
Figure 4C:
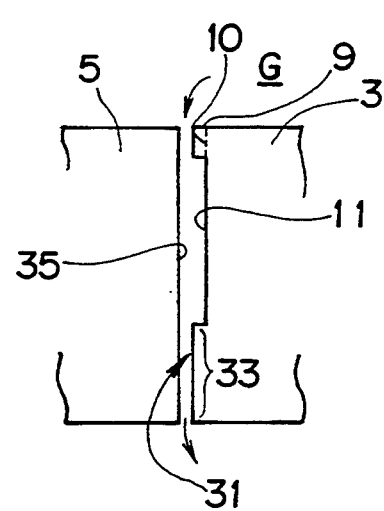

Referring to FIGS. 4A to 4C, passages 10 are formed to the first dam portion 9 so that an inside of each of the floating force generation grooves 11 is communicated with an outside space. As shown in FIG. 4B, the first dam portion 9 is positioned outside the outer diameter end of the fixed side slide member 5, but it may be positioned at a portion of the rotating side slide member 3 opposing to the sliding surface 35 of the fixed side slide member 5 as shown in FIG. 4C without extending beyond the outer peripheral edge of the slide member 5.

Figure 5A:
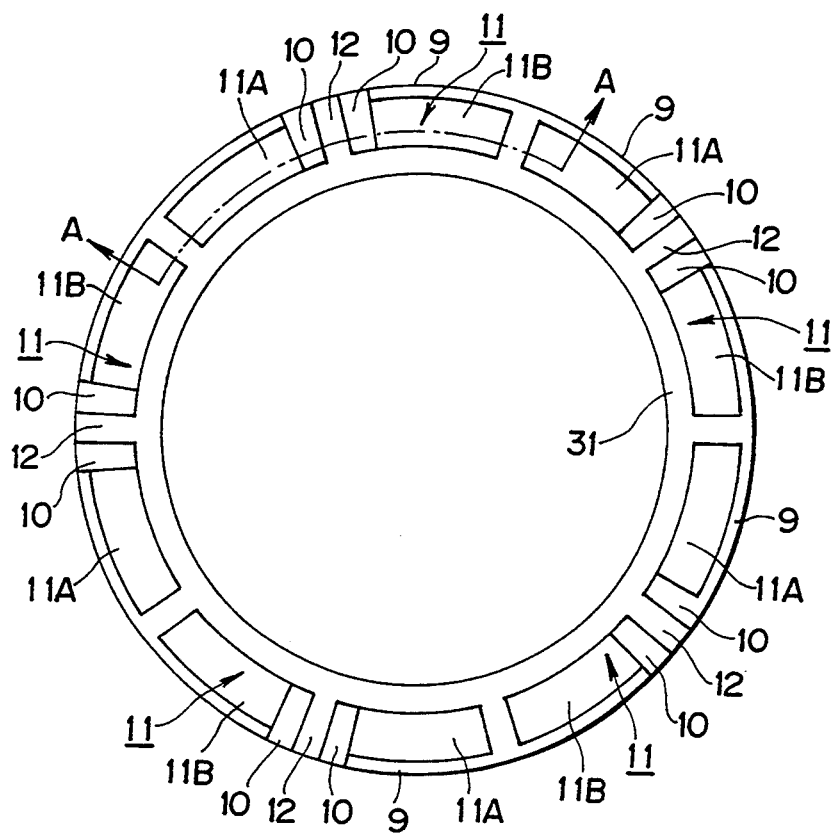
FIG. 5A is a plan view of a slide member of the gas seal of FIG. 4 on which floating force generation grooves are formed.
Figure 5B:
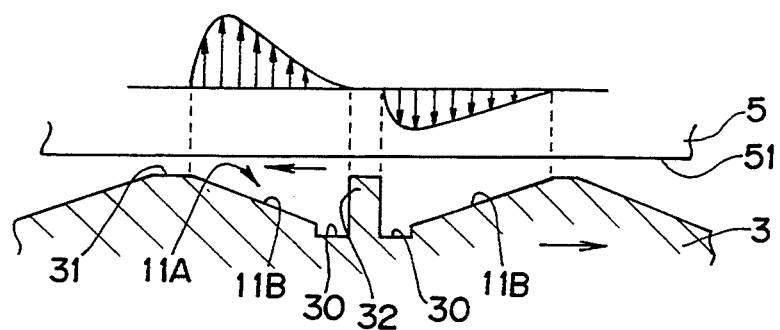
FIGS. 5B and 5D are sectional views of the grooves of FIG. 5A and views showing the dynamic pressures caused by the grooves of FIGS. 5B to 5D.
Figure 5C:
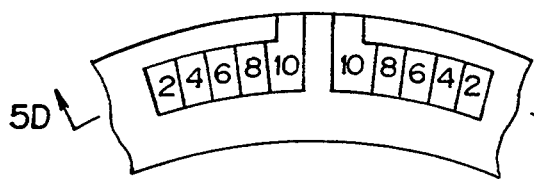
Figure 5D:
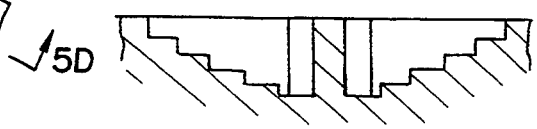
Figure 6A:
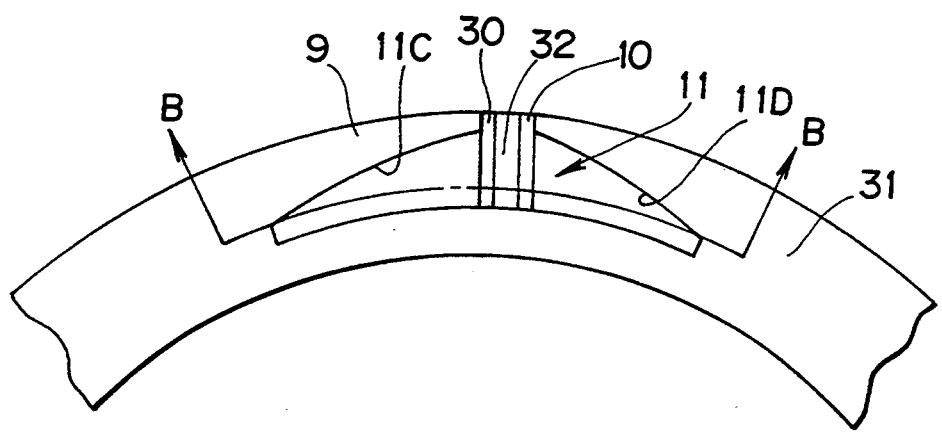
FIGS. 6A to 6C are views showing other examples of the floating force generation grooves according to the embodiment of FIG. 4A.
Figure 6B:
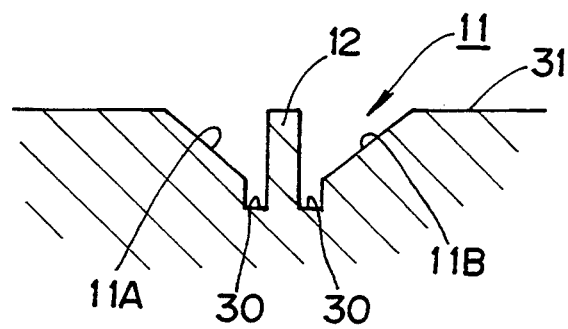

FIGS. 5 and 6 show two examples of the floating force generation grooves 11 each having taper-stepped cross sections as shown in FIGS. 5B and 6B. Namely, as shown in FIG. 5A, the floating force generation groove 11 has substantially an L-shape in a plan view such that a lateral portion of each "L"-shaped groove 11 is formed as the floating force generation groove 11 in the circumferential direction thereof and the first dam portion 9 is formed circumferentially of the outer peripheral portion of the floating force generation groove 11 and such that the gas flow passage 30 communicating the inside of the groove 11 with the outside space is formed in the radial direction so as to constitute a vertical portion of the "L"-shaped groove 11.

As shown in FIG. 5B, the floating force generation groove 11 has a V-shaped cross section having relatively wide open angle and an inside dam portion 32, i.e. second dam portion, is further provided so as to project upward as viewed from the bottom portion of the V-shaped groove 11, thus providing bilaterally reversed tapered surfaces 11A and 11B. The second dam portion 32 is positioned at the central portion of each of the floating force generation grooves 11 and the gas flow passages 30 are formed along both the bilateral sides of the second dam portion 32, one being right side and the other being left side of the dam portion 32.

In such case in which the taper-stepped grooves 11 are formed, the gas G is involved inside the floating force generation grooves 11 through the flow passages 30 formed to the first dam portion 9 during the rotation of the rotation shaft, whereby the positive dynamic pressure is caused, thus causing the floating force between the sliding surfaces of the rotation side and fixed side slide members 3 and 5. The distribution of the dynamic pressure caused between these sliding surfaces is shown in FIG. 5B, in which the pressure is lowered at the tapered surface 11B on the gas upstream flow side and hence a negative pressure acts thereon, and on the contrary, the pressure at the tapered surface 11A on the gas downstream flow side beyond the second dam portion 32 is increased by a wedge function, thus causing a positive floating force. According to the location of the second dam portion 32, the negative pressure at the tapered surface 11B is made small and the positive pressure is hence made large, and as a whole of the entire structure of the floating force generation groove 11, a positive pressure is caused to thereby obtain a large floating force.

According to this embodiment, the outward leakage of the gas involved in the floating force generation grooves 11 can be restricted by the first dam portion 9, whereby a sufficient floating force can be caused even under the low pressure and high speed rotation condition and a gap is ensured between the sliding surfaces of two slide members, thus maintaining the stable sliding performance.

FIG. 5C and 5D are views showing another example of the groove 11 of FIG. 5A similar to that of FIGS. 3D and 3E provided with the stepped tapered portions.

In the embodiment of FIGS. 6A and 6B, a width of the circumferentially end portions of the floating force generation groove 11 is restricted to form the outer diameter side of the groove 11 as tapered surfaces 11C and 11D. The formation of these tapered surfaces 11C and 11D further renders to increase the dynamic pressure to be caused in combination of the wedge function of the tapered surfaces 11A and 11B formed to the bottom of the groove 11.

Figure 6C:
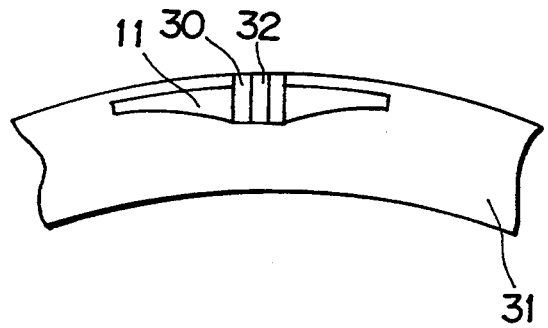
Figure 7A:
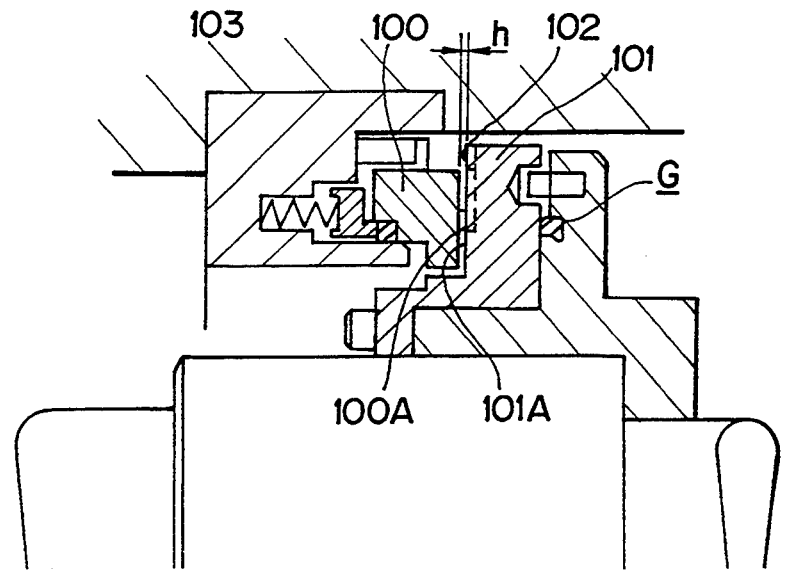
FIG. 7A is a view similar to that of FIG. 1A or 4A, but related to a gas seal of a prior art structure.
Figure 7B:
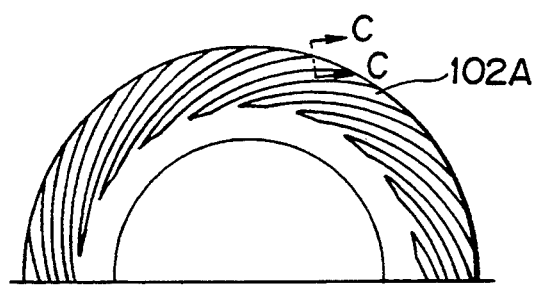
FIG. 7B to 7G are views showing various shapes or types of floating force generation grooves formed to the gas seal of FIG. 7A having conventional structure.
Figure 7C:
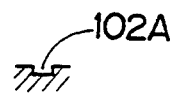
Figure 7D:
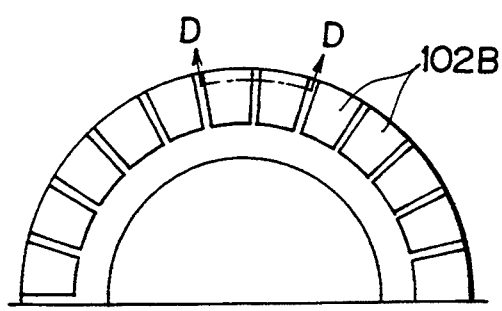
Figure 7E:
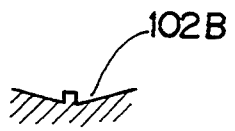
Figure 7F:
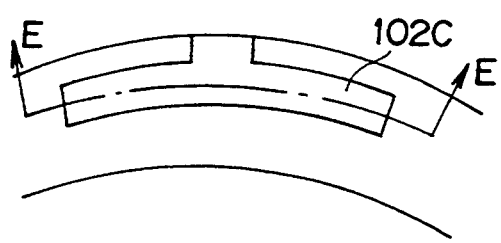
Figure 7G:

FIG. 6C is an example similar to that of FIG. 6A, but having a tapered edge on the inner diameter side of the groove 11.

According to these embodiments in which the gas flow passages are formed, the gas leakage can be restricted by the provision of the first dam portion 9 formed outer diameter side of the floating force generation grooves 11 and the gas flow-in amount can be ensured by the formation of the gas flow passages 30 to the first dam portion 9. Furthermore, the groove 11 is formed so as to have taper-stepped cross section to increase the creation of the dynamic pressure, thus achieving the stable performance of the gas seal even under the low pressure and high speed rotation condition.

What is claimed is:

1. In a gas seal in which a pair of relatively rotatable slide members are disposed and a plurality of grooves for generating a hydrodynamic floating force between sliding surfaces of the slide members during rotation are circumferentially formed to one of said slide members so as to extend in a radial direction thereof, the improvement in which a first dam portion for partitioning a radially inside space in said grooves from an external portion on a radially outer diameter side of said grooves is formed along an entire peripheral portion of the one of the slide members and each of said grooves has a cross section having a central bottom portion and tapered portions extending from the central bottom portion with inclinations reverse to each other in the circumferential direction thereof, said central bottom portion being formed as a second dam portion operated in association with the first dam portion.

2. A gas seal according to claim 1, wherein said tapered portions include steped portions so as to decrease a depth of the groove.

3. A gas seal according to claim 1, wherein said first dam portion has a height substantially equal to a sliding surface of the one slide member and the first dam portion has an upper flat surface continuous to the sliding surface thereof.

4. A gas seal according to claim 1, wherein said first dam portion has a height lower than a level of a sliding surface of the one slide member on which said grooves are formed.

5. A gas seal according to claim 1, wherein said pair of slide members have outer diameters substantially equal to each other.

6. A gas seal according to claim 1, wherein another one slide member opposing to the one slide member on which said grooves are formed has an outer diameter having a dimension between dimensions of outer and inner diameters of the first dam portion.

7. A gas seal according to claim 1, wherein said first dam portion is positioned outside a radially outer periphery of the another one slide member.

8. In a gas seal in which a pair of relatively rotatable slide members are disposed and a plurality of grooves for generating a hydrodynamic floating force between sliding surfaces of the slide members during rotation are circumferentially formed to one of said slide members so as to extend in a radial direction thereof, the improvement in which each groove has a lower central bottom portion, a first dam portion for partitioning a radially inside space of said grooves from an external portion is formed on a radially outer diameter side of said grooves, a second dam portion for bilaterally partitioning each of the grooves is formed at the central bottom portion of the grooves so as to extend in a radial direction thereof, each of said grooves has a cross section along the circumferential direction thereof having tapered portions extending from the second dam portion with inclinations reverse to each other in the circumferential direction thereof, and a pair of gas flow passages are formed on both sides of said first and second dam portions, with the second dam portion being interposed between each gas flow passage of a pair of gas flow passages, said gas flow passages communicating with the grooves and the external portion.

9. A gas seal according to claim 8, wherein a width between both circumferential end portions of each of said grooves is restricted.

10. A gas seal according to claim 9, wherein said gas flow passages are formed in parallel to said second dam portion on both sides thereof.

11. A gas seal according to claim 8, wherein said first dam portion has a height substantially equal to a sliding surface of the one slide member and the first dam portion has an upper flat surface continuous to the sliding surface thereof.

12. A gas seal according to claim 8, wherein said first dam portion has a height lower than a level of a sliding surface of the one slide member.

13. A gas seal according to claim 8, wherein said pair of slide members have outer diameters substantially equal to each other.

14. A gas seal according to claim 8, wherein another one slide member opposing to the one slide member on which said grooves are formed has an outer diameter having a dimension between dimensions of outer and inner diameters of the first dam portion.

15. A gas seal according to claim 8, wherein said first dam portion is positioned outside a radially outer periphery of the another one slide member.

* * * * *